United States Patent
Kuo et al.

(10) Patent No.: US 7,512,490 B2
(45) Date of Patent: Mar. 31, 2009

(54) METHOD FOR REMINDING OF ENTERING TARGET ROUTE

(75) Inventors: Ming-Jen Kuo, Taipei (TW); Ko-Yi Yao, Taoyuan (TW)

(73) Assignee: Mitac International Corp., Taoyuan (TW)

( * ) Notice: Subject to any disclaimer, the term of this patent is extended or adjusted under 35 U.S.C. 154(b) by 499 days.

(21) Appl. No.: 11/164,821

(22) Filed: Dec. 7, 2005

(65) Prior Publication Data

US 2007/0061073 A1 Mar. 15, 2007

(30) Foreign Application Priority Data

Sep. 12, 2005 (TW) ............................... 94131269 A

(51) Int. Cl.
*G01C 21/00* (2006.01)
*G06F 19/00* (2006.01)
(52) U.S. Cl. ..................... 701/211; 701/209; 701/213; 340/995.23
(58) Field of Classification Search ................ 701/211, 701/201, 209, 213; 340/995.19, 995.23
See application file for complete search history.

(56) References Cited

U.S. PATENT DOCUMENTS

| 5,729,109 | A * | 3/1998 | Kaneko et al. | 318/587 |
| 5,938,718 | A * | 8/1999 | Morimoto et al. | 701/201 |
| 6,219,614 | B1 * | 4/2001 | Uchigaki et al. | 701/211 |
| 6,347,280 | B1 * | 2/2002 | Inoue et al. | 701/211 |
| 6,643,585 | B2 * | 11/2003 | McGovern | 701/211 |
| 6,691,028 | B2 * | 2/2004 | Bullock et al. | 701/202 |

\* cited by examiner

*Primary Examiner*—Tan Q Nguyen
(74) *Attorney, Agent, or Firm*—Jianq Chyun IP Office

(57) ABSTRACT

A method for reminding of entering a target route is disclosed. First, the method provides a Point of Interest (POI) at a conjunction of the present route and the target route and sets the POI as a basic voice reminding point. Next, the method determines whether the actual distance between the present position and the basic voice reminding point is less than or equal to the voice reminding distance. Then, when the actual distance between the present position and the basic voice reminding point is less than or equal to the voice reminding distance, a voice reminding message is sent out as the reminding of entering the target route correctly.

18 Claims, 3 Drawing Sheets

METHOD FOR REMINDING OF ENTERING TARGET ROUTE

CROSS-REFERENCE TO RELATED APPLICATION

This application claims the priority benefit of Taiwan application serial no. 94131269, filed on Sep. 12, 2005. All disclosure of the Taiwan application is incorporated herein by reference.

BACKGROUND OF THE INVENTION

1. Field of the Invention

The present invention relates to a method for reminding of entering a target route, and more particularly, to a method for the navigation apparatus to send out a voice reminding message by configuring a Point of Interest (POI) in every highway entrance and exit.

2. Description of the Related Art

Along with the continuous development of the technology, various mobile devices have been developed to facilitate the users in processing and transmitting the information. Here, the mobile device may be a Note Book (NB), a handheld PC (HPC), a smart phone, a Personal Digital Assistant (PDA), a Pocket PC and a mobile phone.

Currently, Global Positioning System (GPS) is commonly used in the advanced mobile devices. With the cooperation of the GPS and the navigation apparatus, various types of information related to the present location can be displayed on the screen of the automobile to guide the driver's direction.

The electronic map of a navigation apparatus usually contains many Points of Interest (POI) such as the beautiful scenery, restaurants, hospitals, gas stations, or highway entrances or exits, etc.

In the conventional technique, when the voice navigation function provided by the navigation apparatus is based on the information of the POI configured at the highway entrances or exits, some problems may occur. For example, if the actual distance is calculated based on the conventional POI, a certain gap may exist between the calculation value and the actual distance. In addition, the voice navigation message provided by the navigation apparatus may not conform to the real case. For instance, FIG. 1 illustrates the highway intersections of South Taoyuan. In FIG. 1, the current location of the automobile is at the actual location 100, and the location of POI configured the highway intersections of South Taoyuan on the navigation apparatus of FIG. 1 is 120. If the driver plans to exit from the highway exit 110, in the conventional technique, the navigation apparatus will use the POI position 120 as a basic voice reminding point. In other words, when the distance between the actual automobile location 100 and the POI position 120 is less than or equal to the voice reminding distance, the navigation apparatus will provide a voice reminding message to guide the driver to exit from the highway exit.

However, there are usually more than one exits or even connections to other expressways at the highway intersections of a certain place. In addition, it is common that only one POI position 120 for indicating the highway exit is configured in the conventional navigation apparatus. Such configuration (i.e. some exits are located before the POI position 120 and some exits may be located after the POI position 120) causes the navigation problem of the navigation apparatus, which disturbs and confuses the driver, thus the driver may miss the right exit and spend more time in the unnecessary route. In addition, when the driver desires to enter a highway from a road through the highway entrance, it also happens quite often that the driver misses the highway entrance.

SUMMARY OF THE INVENTION

Therefore, it is an object of the present invention to provide a method for reminding of entering a target route. By configuring a POI in every entrance and exit of the complicated road, the navigation apparatus can provide an accurate voice reminding message to the user.

It is another object of the present invention to provide a method for configuring the Point of Interest (POI). A conjunction of the present route and the target route is obtained and set as the POI by separating the map layer of the present route and the target route and finding the intersection thereof.

The present invention provides a method for reminding of entering a target route, and the method is suitable for entering the target route from a present route on a present position. The method comprises the following steps. First, the method provides a Point of Interest (POI) at the conjunction of the present route and the target route and sets the POI as a basic voice reminding point. Next, the method determines whether the actual distance between the present position and the basic voice reminding point is less than or equal to the voice reminding distance. Then, when the actual distance between the present position and the basic voice reminding point is less than or equal to the voice reminding distance, a voice reminding message is sent out for reminding the user to enter the target route.

In accordance with a preferred embodiment of the present invention, the step of providing the POI at the conjunction of the present route and the target route mentioned above comprises the following steps. First, an electronic map is extracted. Next, the present route is set as a first map layer and the target route is set as a second map layer on the electronic map. Then, a plurality of intersection points is obtained by corresponding the present route on the first map layer to the target route on the second map layer, and one of the intersection points is set as a conjunction for providing the POI.

The method for reminding of entering the target route according to the preferred embodiment of the present invention further comprises: when the actual distance between the present position and the basic voice reminding point is greater than the voice reminding distance, continuously determining whether the actual distance between the present position and the basic voice reminding point is less than or equal to the voice reminding distance.

In accordance with the preferred embodiment of the present invention, the present route mentioned above is a common road and the target route is a highway entrance.

In accordance with the preferred embodiment of the present invention, the present route mentioned above is a highway and the target route is a highway exit.

In accordance with the preferred embodiment of the present invention, the present position mentioned above is a position detected by the GPS when it is activated.

The present invention further provides a method for configuring a Point of Interest (POI), and the method is suitable for entering a target route from a present route on a present position through a conjunction. First, an electronic map is extracted. Next, the present route is set as a first map layer and the target route is set as a second map layer on the electronic map. Then, a plurality of intersection points is obtained by corresponding the present route on the first map layer to the target route on the second map layer, and one of the intersection points is set as a conjunction for configuring the POI.

In accordance with the preferred embodiment of the present invention, the conjunction mentioned above connects both the present route and the target route.

More POIs are configured at the highway intersections for providing the information of entering or exiting the highway correctly in the present invention. Accordingly, when the navigation apparatus is used to guide the driver, the actual distance of entering or exiting the highway is accurately estimated, such that the navigation apparatus can provide an accurate voice reminding message to remind the user, and the problem that the voice reminding message is not conformed to the actual case is eliminated.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF PREFERRED EMBODIMENTS

Figure 1:
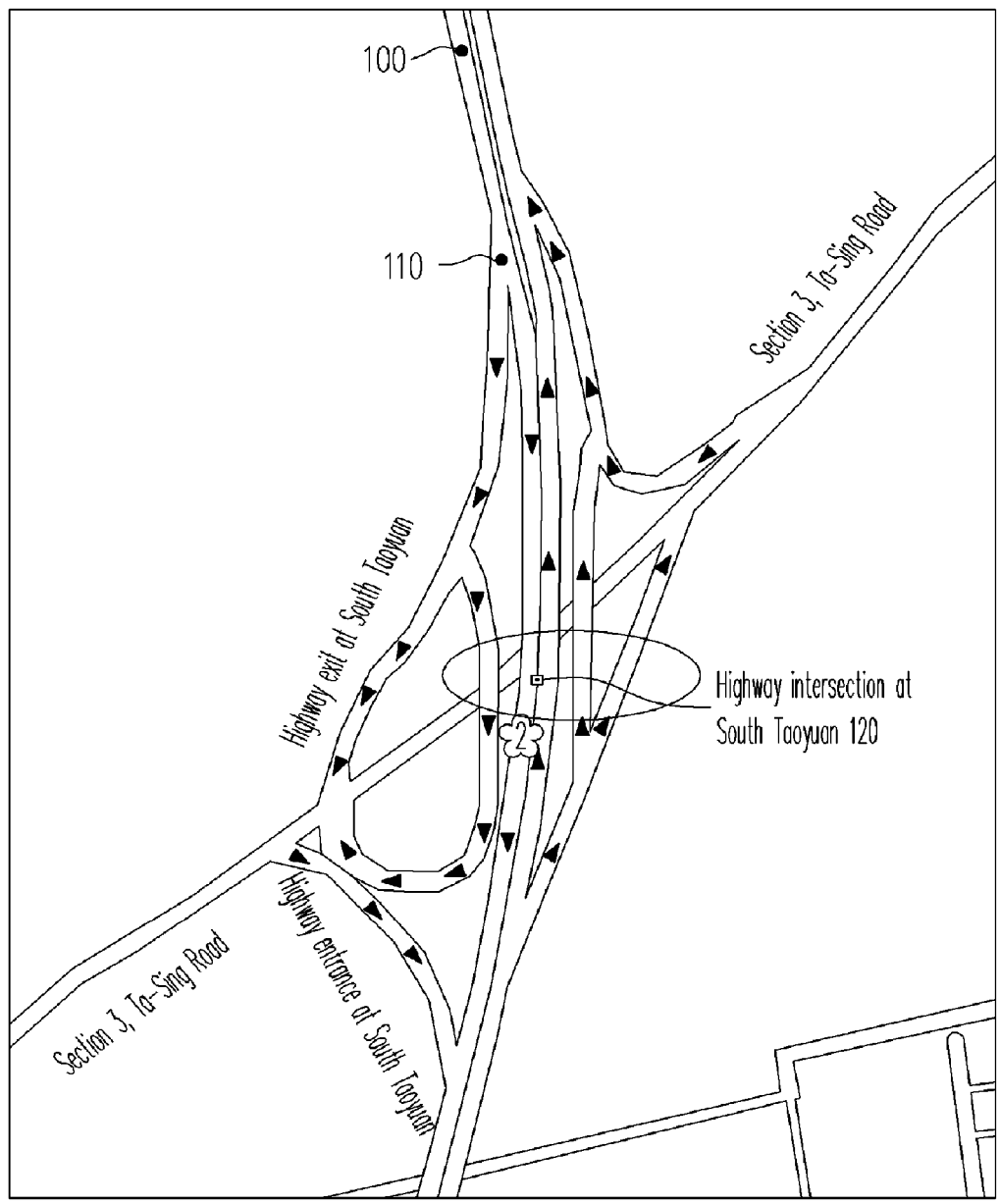
FIG. 1 is a map showing the highway intersections at South Taoyuan.
Figure 2:
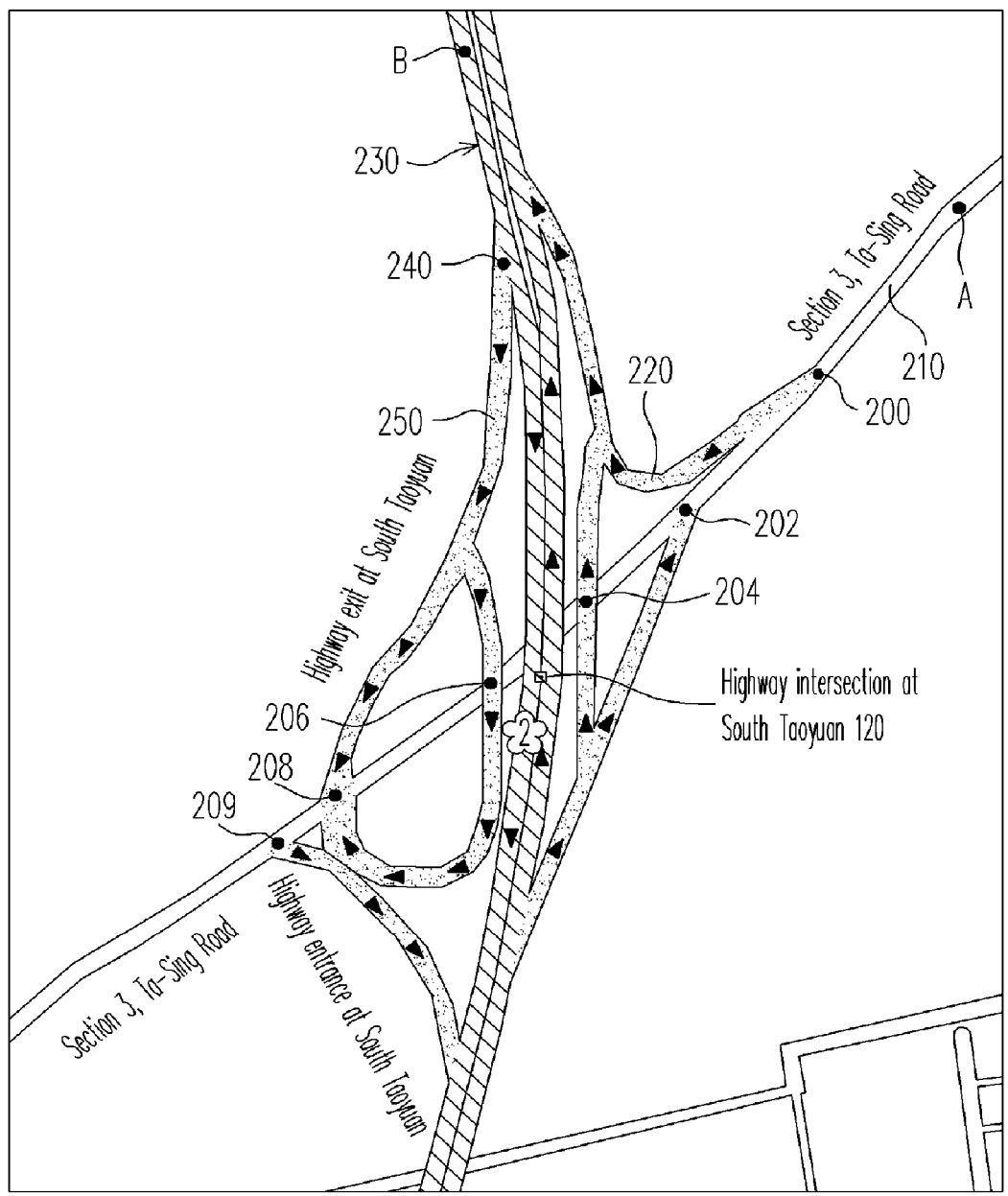
FIG. 2 is an electronic map of the highway intersections at South Taoyuan according to a preferred embodiment of the present invention.

In order to have a better understanding of the embodiments of the present invention, a map showing the highway intersections at South Taoyuan of FIG. 2 is exemplified herein for describing the method for reminding of entering the target route provided by the present invention.

Referring to FIG. 2, in the first embodiment, the target route is the highway entrance 220, the present route is 210 (Section 3, Ta-Sing Road) and the present position A is the current position of the user's car detected by the GPS.

Figure 3:
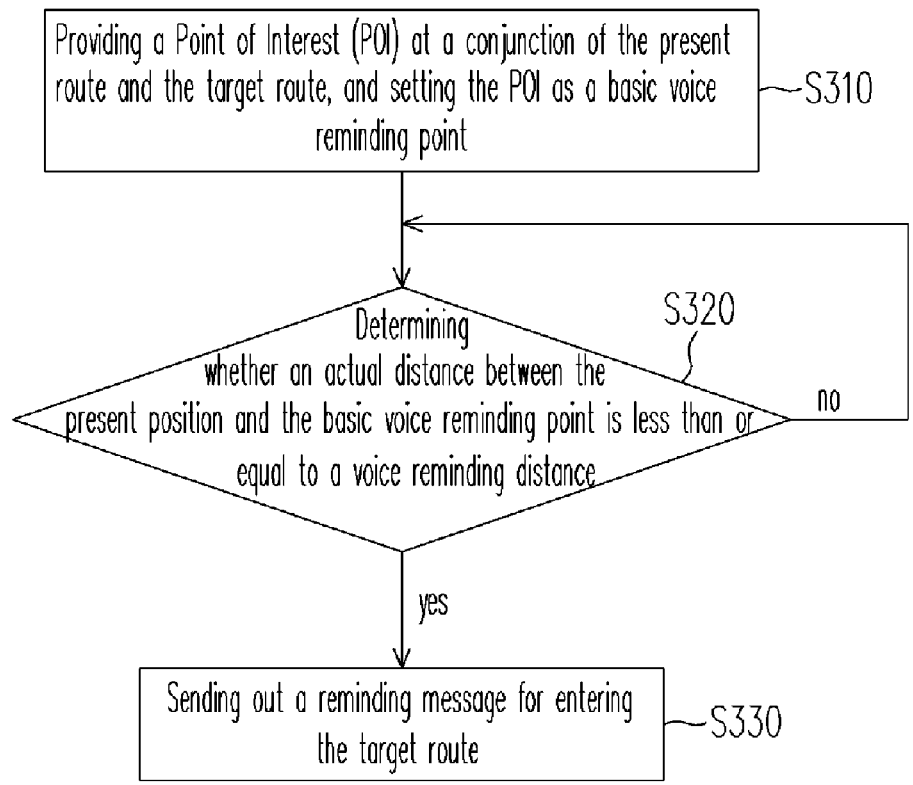
FIG. 3 schematically shows a flowchart illustrating a method for reminding of entering a target route according to a preferred embodiment of the present invention.

FIG. 3 schematically shows a flowchart illustrating a method for reminding of entering a target route according to a preferred embodiment of the present invention. The method is described with reference to FIG. 2 as follows. First, the navigation apparatus provides a POI at the conjunction 200 where the Section 3, Ta-Sing Road meets the highway entrance 220, and sets the POI as a basic voice reminding point (S310).

Then, the navigation apparatus determines whether the actual distance between the present position and the basic voice reminding point is less than or equal to a voice reminding distance (S320). For example, if the voice reminding distance predetermined by the navigation apparatus is 300 meters, and the actual distance calculated by the navigation apparatus is 250 meters, a voice reminding message is sent out by the navigation apparatus to remind the user of "entering highway entrance in 250 meters ahead" (S330). In addition, since the car is moving closer to the conjunction 200 gradually, the actual distance is continuously modified based on the different positions detected by the GPS, such that an accurate voice reminding message can be provided and the user will not miss the right timing of entering the highway entrance.

In the case where the actual distance between the present position and the basic voice reminding point is greater than the voice reminding distance, for example, the voice reminding distance is 300 meters, and the actual distance is 400 meters, the process goes back to step S320 to continuously determine whether the actual distance between the present position and the basic voice reminding point is less than or equal to a voice reminding distance until the actual distance is less than or equal to the voice reminding distance.

In the second embodiment, the target route is the highway exit 250, the present route is the highway 230 and the present position B is the current position of the user's car detected by the GPS. Similarly, the method comprises the following steps. First, the navigation apparatus provides a POI at the conjunction of the highway 230 and the highway exit 250 (S310).

Next, the navigation apparatus calculates the actual distance between the POI and the present position B (e.g. the actual distance is 250 meters), determines whether the actual distance is less than a voice reminding distance (e.g. the voice reminding distance is 300 meters) (S320), and sends out an accurate voice reminding message to remind the user of "exiting highway exit in 250 meters ahead" (S330).

Figure 4:
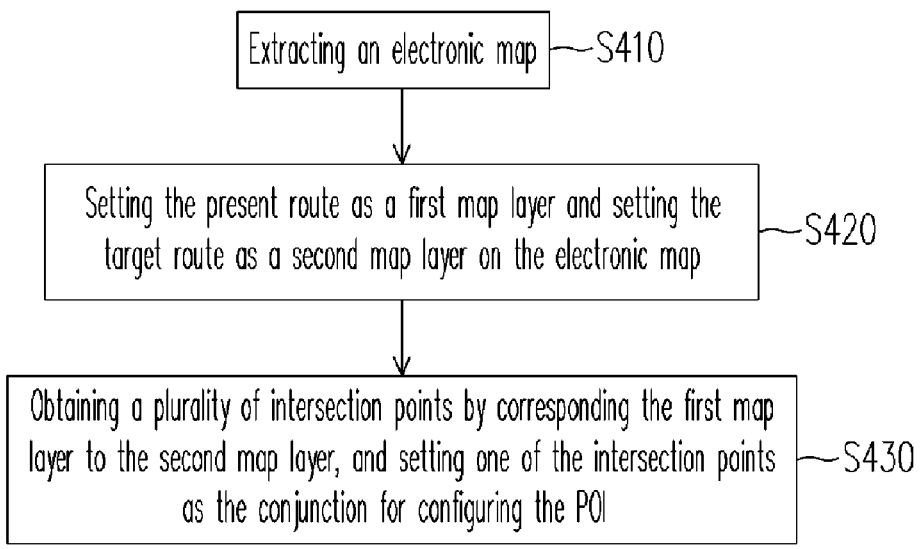
FIG. 4 schematically shows a flowchart illustrating a method for configuring a Point of Interest (POI) provided by step S310 in FIG. 3 according to a preferred embodiment of the present invention.

Accordingly, a method for configuring a Point of Interest (POI) is provided by the present invention. FIG. 4 schematically shows a flowchart illustrating a method for configuring a Point of Interest (POI) provided by step S310 in FIG. 3 according to a preferred embodiment of the present invention. The method comprises the following steps. First, an electronic map is extracted from the navigation apparatus (S410). Next, the present route is set as a first map layer and the target route is set as a second map layer on the electronic map (S420). For example, 210 of Section 3, Ta-Sing Road is set as the first map layer, and the highway entrance 220 is set as the second map layer.

Then, a plurality of intersection points (e.g. the intersection points 200, 202, 204, 206, and 208) is obtained by corresponding 210 (Section 3, Ta-Sing Road) on the first map layer to the highway entrance 220 on the second map layer, and one of the intersection points is set as a conjunction. Specifically, all other intersection points that cannot enter the highway entrance 220 from the 210 of Section 3, Ta-Sing Road (i.e. the intersection points 202, 204, 206, 208, and 209) are deleted, and the remaining point is the conjunction where the 210 (Section 3, Ta-Sing Road) meets the highway entrance 220. Finally, a POI is configured at the conjunction (S430) serving as the POI required by the navigation apparatus to guide the route.

In the preferred embodiment of the present invention, the highway and the highway intersections are set on the same map layer, and the common roads connecting to the highway intersections are set as the other map layer. In such case, it is possible to calculate the conjunctions when planning the route, and a POI is temporarily added to every conjunction for providing an accurate voice reminding message without having to set the POI on the map in advance.

In the preferred embodiment of the present invention, wherein the method for configuring the POI described in the above embodiments, one point among the intersection points may be easily set as the conjunction by one of the ordinary skill in the art, and the method can be applied in the case where the user requires to set the POI of the target route (a highway entrance or exit) automatically, but it is not necessarily limited by it.

In summary, in the present invention, since the method for reminding of entering the target route is applied, the mobile device with the navigation function can provide an accurate voice reminding message of entering or exiting the target route (a highway entrance or exit). Accordingly, the problem that the voice reminding message is not conformed to the real case is eliminated. In addition, the conjunction where the POI is configured is automatically obtained by means of corresponding map layers, which facilitates the configuration of the POI.

According to the embodiments above, the present invention also discloses a method for reminding of entering a target route from a present route on a present position, applicable to a mobile device with a GPS. The method comprises the following steps. First, Provide a POI at a conjunction of the present route and the target route, with the POI set as a basic voice reminding point. Next, Determine whether an actual distance between the present position and the basic voice reminding point is less than or equal to a voice reminding distance. Then send out a reminding message for entering the target rout.

According to the embodiments above, the present invention further discloses a method for configuring a POI suitable for entering a target route from a present route on a present position through a conjunction, applicable to a mobile device with a GPS. The method comprises the following steps. First, extract an electronic map. Next, set the present route as a first map layer and the target route as a second map layer on the electronic map. Then, compare the first map layer with the second map layer to obtain and set one of plurality of intersection points as the conjunction for providing the POI.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for reminding of entering a target route suitable for entering the target route from a present route on a present position, and the method comprising:

provinding a Point of Interest (POI) at a conjunction of the present route and the target route, and setting the POI as a basic voice reminding point, wherein the step of providing the POI at the conjunction of the present route and the target route comprises:

extracting an electronic map;

setting the present route as a first map layer and setting the target route as a second map layer on the electronic map; and obtaining a plurality of intersection points by corresponding the first map layer to the second map layer, and setting one of the intersection points as the conjunction for providing the POI;

determining whether an actual distance between the present position and the basic voice reminding point is less than or equal to a voice reminding distance; and sending out a reminding message for entering the target route when the actual distance between the present position and the basic voice reminding point is less than or equal to a voice reminding distance.

2. The method for reminding of entering the target route of claim 1, further comprising when the actual distance between the present position and the basic voice reminding point is greater than the voice reminding distance, continuously determining whether the actual distance between the present position and the basic voice reminding point is less than or equal to the voice reminding distance.

3. The method for reminding of entering the target route of claim 1, wherein the present route is a common road and the target route is a highway entrance.

4. The method for reminding of entering the target route of claim 1, wherein the present route is a highway and the target route is a highway exit.

5. The method for reminding of entering the target route of claim 1, wherein the present position is a position detected by Global Positioning System (GPS) when it is activated.

6. The method for reminding of entering the target route of claim 1, wherein the reminding message is a voice reminding message.

7. A method for configuring a Point of Interest (POI) suitable for entering a target route from a present route on a present position through a conjunction, applicable to a mobile device with a GPS, the method comprising the steps of:

extracting an electronic map;

setting the present route as a first map layer and setting the target route as a second map layer on the electronic map; and obtaining a plurality of intersection points by comparing the first map layer with the second map layer, and setting one of the intersection points as the conjunction for configuring the POI.

8. The method for configuring the POI of claim 7, wherein the conjunction connects both the present route and the target route.

9. The method for configuring the POI of claim 7, wherein the present route is a common road or a highway and the target route is a highway entrance or a highway exit.

10. A method for reminding of entering a target route from a present route on a present position, applicable to a mobile device with a GPS (Global Positioning System), the method comprising the steps of:

providing a POI (Point of Interest) at a conjunction of the present route and the target route, with the POI set as a basic voice reminding point, wherein the step of providing the POI at the conjunction of the present route and the target route comprises:

extracting an electronic map;

setting the present route as a first map layer and setting the target route as a second map layer on the electronic map; and comparing the first map layer with the second map layer to obtain and set one of a plurality of intersection points as the conjunction for providing the POI;

determining whether an actual distance between the present position and the basic voice reminding point is less than or equal to a voice reminding distance; and sending out a reminding message for entering the target route when the actual distance between the present position and the basic voice reminding point is less than or equal to a voice reminding distance.

11. The method for reminding of entering the target route of claim 10, further comprising when the actual distance between the present position and the basic voice reminding point is greater than the voice reminding distance, continuously determining whether the actual distance between the present position and the basic voice reminding point is less than or equal to the voice reminding distance.

12. The method for reminding of entering the target route of claim 10, wherein the present route is a common road and the target route is a highway entrance.

13. The method for reminding of entering the target route of claim 10, wherein the present route is a highway and the target route is a highway exit.

14. The method for reminding of entering the target route of claim 10, wherein the present position is a position detected by the GPS when it is activated.

15. The method for reminding of entering the target route of claim 10, wherein the reminding message is a voice reminding message.

16. A method for configuring a Point of Interest (POI) suitable for entering a target route from a present route on a present position through a conjunction, applicable to a mobile device with a GPS, the method comprising the steps of:

extracting an electronic map;

setting the present route as a first map layer and setting the target route as a second map layer on the electronic map; and comparing the first map layer with the second map layer to obtain and set one of plurality of intersection points as the conjunction for providing the POI.

17. The method for configuring the POI of claim 16, wherein the conjunction connects both the present route and the target route.

18. The method for configuring the POI of claim 16, wherein the present route is a common road or a highway and the target route is a highway entrance or a highway exit.

* * * * *